(12) United States Patent
Hu et al.

(10) Patent No.: US 12,077,459 B2
(45) Date of Patent: Sep. 3, 2024

(54) DEVICE AND METHOD FOR MUD SOLIDIFICATION BASED ON ELECTRO-OSMOSIS WELL POINTS COOPERATING WITH WELL-POINTS DEWATERING

(71) Applicants: Shaoxing University, Shaoxing (CN); Zhejiang University City College, Hangzhou (CN)

(72) Inventors: Yunjin Hu, Shaoxing (CN); Feng Chen, Shaoxing (CN); Jiqing Jiang, Shaoxing (CN); Lianying Zhou, Shaoxing (CN); Lu Shi, Shaoxing (CN)

(73) Assignees: SHAOXING UNIVERSITY, Shaoxing (CN); ZHEJIANG UNIVERSITY CITY COLLEGE, Hangzhou (CN)

( * ) Notice: Subject to any disclaimer, the term of this patent is extended or adjusted under 35 U.S.C. 154(b) by 910 days.

(21) Appl. No.: 17/096,311

(22) Filed: Nov. 12, 2020

(65) Prior Publication Data
US 2021/0139361 A1 May 13, 2021

(30) Foreign Application Priority Data
Nov. 13, 2019 (CN) .......................... 201911103631.5

(51) Int. Cl.
*C02F 11/00* (2006.01)
*B01D 61/42* (2006.01)
(Continued)

(52) U.S. Cl.
CPC .......... *C02F 11/006* (2013.01); *B01D 61/427* (2013.01); *B01D 61/56* (2013.01);
(Continued)

(58) Field of Classification Search
CPC ..... B01D 61/427; B01D 61/56; C02F 1/4698; E02D 3/10; E02D 19/10
See application file for complete search history.

(56) References Cited

U.S. PATENT DOCUMENTS 1,852,096 A * 4/1932 White ...................... E02D 7/26
173/152
4,671,874 A * 6/1987 Fremont ................. C02F 11/15
210/243

FOREIGN PATENT DOCUMENTS

JP 2004183282 A * 7/2004

* cited by examiner

*Primary Examiner* — Luan V Van
*Assistant Examiner* — Andrew Koltonow
(74) *Attorney, Agent, or Firm* — Billion & Armitage

(57) ABSTRACT

A device and method for mud solidification based on electro-osmosis well points cooperating with well-points dewatering. The method includes the following steps: 1) preparation; 2) construction of well point pipe positioning frame beams; 3) assembly of a mobile trestle platform; 4) well point pipe arrangement; 5) well point/electro-osmosis dewatering; 6) filtrate treatment; 7) well point pipe dismantling; and 8) excavation and transportation of solidified drilling slag for utilization. According to the disclosure, well point pipes are adopted and used as an anode and a cathode of an electro-osmosis well, and on-site quick solidification of pile foundation mud is implemented through the electro-osmosis combined with light well-points dewatering; by the adoption of the well point pipe positioning frame beams, the problems that drilling slag in a sedimentation tank has a large water content and it is difficult to arrange and fix the well point pipes are well solved.

2 Claims, 3 Drawing Sheets

(51) Int. Cl.
*B01D 61/56* (2006.01)
*C02F 1/00* (2023.01)
*E02D 3/10* (2006.01)
*E02D 3/11* (2006.01)

(52) U.S. Cl.
CPC .............. *C02F 11/008* (2013.01); *E02D 3/10* (2013.01); *E02D 3/11* (2013.01); *C02F 2001/007* (2013.01); *E02D 2220/00* (2013.01)

DEVICE AND METHOD FOR MUD SOLIDIFICATION BASED ON ELECTRO-OSMOSIS WELL POINTS COOPERATING WITH WELL-POINTS DEWATERING

CROSS REFERENCE TO RELATED APPLICATION

This application claims the priority of Chinese Patent Application No. 201911103631.5 entitled "Device and Method for Mud Solidification Based on Electro-Osmosis Well Points Cooperating with Well-Points Dewatering" filed with China National Intellectual Property Administration on Nov. 13, 2019, which is incorporated herein by reference in its entirety.

TECHNICAL FIELD

The disclosure relates to a pile foundation mud treatment device, and in particular, to a device and method for mud solidification based on electro-osmosis well points cooperating with well-points dewatering.

BACKGROUND

With increasing economic development and urbanization, the construction of various projects has developed rapidly. An annual output of several hundred million cubic meters of pile foundation mud has been generated in the construction process of bridge engineering pile foundations and underground engineering foundation pit support, etc. Pile foundation mud is mainly muddy water containing silt. The silt is suspended in water and has low precipitation efficiency, and direct discharge will cause serious pollution to the water. At present, the methods for mud purification in the industry mainly include: (1) Natural precipitation: pits are dug on site or in different places, a dam is piled, and mud is collected and naturally air-dried. This method requires a large occupied area and a long air-drying period (about five years), makes it difficult to implement second ploughing of land, destroys the ecology and is unsafe, and it is difficult to borrow land in cities. (2) The mud is transported to the open sea for direct discharge. In use of this method, illegal discharge is very likely to occur due to the driving by interests, causing environmental or water pollution, blockage of municipal pipelines and other hazards. With the continuous strengthening of civilization consciousness and environmental protection consciousness in modern society, local governments pay more and more attention to the effective disposal of construction mud. The environmental protection treatment technology which uses cement and quicklime for solidification or uses a filter pressing technology for solid-liquid separation has been gradually applied, but these treatment technologies generally require centralized treatment, which is high in cost. On-site treatment and full utilization of pile foundation mud has become an important problem that must be faced with and solved in current construction projects.

SUMMARY

In view of the problems that the centralized stacking of pile foundation mud for natural air drying requires a large occupied area and a long air drying cycle and has low precipitation efficiency, the mud is illegally discharged in the transport process and the centralized treatment cost is high, according to the characteristics of complex geology of a pile foundation and high water content of drilling slag, the disclosure provides a device and method for mud solidification based on electro-osmosis well points cooperating with well-points dewatering, which implement less occupied area, harmless treatment and resource recycling, environmental protection, energy saving and zero emission.

A device for mud solidification based on electro-osmosis well points cooperating with well-points dewatering includes a mud tank, a sedimentation tank, well point pipe support beams, well point pipe positioning frame beams, channel steel bearing beams around a shore, well point pipes, a water collecting main pipe, connecting elbows, a vacuum water pump house, a mud discharging pipe, a slurry storage tank, a primary cleaning tank, a secondary cleaning tank, a connecting wire, a DC generator and filter pipes; where the sedimentation tank has a rectangular structure, the channel steel bearing beams around a shore are laid on a tank wall inner side of the sedimentation tank, the well point pipe support beams are laid at the top of the sedimentation tank at equal intervals in a direction parallel to a short edge of the sedimentation tank, and the well point pipe positioning frame beams are arranged on the well point pipe support beams at equal intervals in a direction parallel to a long edge of the sedimentation tank; well point pipe holes are preset in the well point pipe positioning frame beams, the well point pipes are arranged in the well point pipe holes, and a lower portion of each well point pipe is one filter pipe; the water collecting main pipe is arranged at the top of the well point pipe in the direction parallel to the short edge of the sedimentation tank, the top of the well point pipe is connected to the water collecting main pipe through the connecting elbow; the well point pipe is connected to the DC generator through the connecting wire; the water collecting main pipe is communicated with the primary cleaning tank through the vacuum water pump house, the primary cleaning tank is communicated with the secondary cleaning tank and the slurry storage tank, and the sedimentation tank is communicated with the mud tank through the mud discharging pipe.

Preferably, the well point pipe holes in the well point pipe positioning frame beam are arranged in a quincuncial shape.

Preferably, a pipe body of the filter pipe is provided with quincuncial holes.

Preferably, the water collecting main pipe is arranged in an S shape in the direction parallel to the short edge of the sedimentation tank.

Preferably, a pipe opening of the mud discharging pipe close to the sedimentation tank is provided with a filter screen and a mud discharging pipe cover.

A treatment method using the device for mud solidification based on electro-osmosis well points cooperating with well-points dewatering includes the following steps:

step 1: preparation; where according to the project scale and site conditions, the setting positions and excavation sizes of a mud tank, a sedimentation tank, a slurry storage tank, a primary cleaning tank and a secondary cleaning tank are determined; the sedimentation tank is arranged in an elongated shape, and a wall of the tank is constructed with brick and mortar plastering; a well point pipe dewatering device with a depth matched with a depth of the sedimentation tank is adopted; each well point pipe is a steel pipe, a lower portion thereof is a filter pipe, connecting elbows are rubber tubes or plastic transparent tubes, and each tube is provided with a valve; a water collecting main pipe is connected by steel pipes in a segmented mode, a well point pipe joint is set at regular intervals; an anode and cathode of an electro-osmosis well are the well point pipes and are electrified by a DC generator;

step 2: construction of well point pipe positioning frame beams; where the well point pipes are arranged in a quincuncial shape based on the large water content of drilling slag in the sedimentation tank; channel steel bearing beams around a shore are laid around the sedimentation tank, then well point pipe support beams are laid at equal intervals in a direction parallel to a short edge of the sedimentation tank, and well point pipe positioning frame beams are arranged at equal intervals on the well point pipe support beams in a direction parallel to a long edge of the sedimentation tank; the well point pipe positioning frame beams are obtained by processing steel plates, and the well point pipe positioning frame beams are cut in advance to form well point pipe holes;

step 3: assembly of a mobile trestle platform; where the mobile trestle platform is assembled on land at one side of the sedimentation tank;

step 4: well point pipe arrangement; where the mobile trestle platform is utilized to, according to the well point pipe holes in the well point pipe positioning frame beams at the top of the sedimentation tank, arrange well point pipes row by row in a direction parallel to the short edge of the sedimentation tank; in case of parts where it is difficult to perform local arrangement, high-pressure water is adopted to assist in punching and embedding; the water collecting main pipe is arranged in an S shape in the direction parallel to the short edge of the sedimentation tank, and the top of the well point pipe is connected to the water collecting main pipe through a connecting elbow; after all the well point pipes, the water collecting main pipe and the connecting wire of the anode and the cathode are connected, the mobile trestle platform is moved out of the sedimentation tank;

step 5: well point/electro-osmosis dewatering; where well-points dewatering or electro-osmosis dewatering is performed according to the pile foundation geology; when drilling slag is sandy soil, crushed gravel or broken pebbles, etc. with a permeability coefficient greater than 3 m/d, the well point pipes are directly used for dewatering; when the drilling slag is silt or clay with a small permeability coefficient, the well point pipes themselves are used as the anode and the cathode and connected to the DC generator through the connecting wire, a direct current is introduced to perform electro-osmosis dewatering, water in the drilling slag is forced to be discharged from the well point pipes under double action of electro-osmosis and vacuum in the well point pipes, and water in the well points is pumped continuously, so that water in the drilling slag is discharged for mud solidification; when the geology is complex and the drilling slag is various mixed soil, well-points dewatering is performed first and then the electro-osmosis dewatering is adopted to accelerate mud solidification;

step 6: filtrate treatment; where muddy water discharged out of the water collecting main pipe via the well-points dewatering first flows into the primary cleaning tank; after preliminary precipitation, supernatant flows into the secondary cleaning tank, and bottom slurry is discharged into the slurry storage tank for preparation of mud; and clear liquid in the secondary cleaning tank is used for structural curing or preparation of muddy water;

step 7: well point pipe dismantling; where the well point pipes are dismantled after muck solidification of well point/electro-osmosis dewatering is completed; and step 8: excavation and transportation of solidified drilling slag for utilization; where gravel soil drilling slag is directly excavated and transported for roadbed filling; cement or quicklime is added to silt or clay for further solidification and then the silt or clay is uniformly transported out for use or stacking.

The disclosure has the following beneficial effects:

1) The disclosure adopts well point pipes and takes the well point pipes as an anode and a cathode of an electro-osmosis well, and implements on-site quick solidification of pile foundation mud through the electro-osmosis combined with light well-points dewatering by using the electro-osmosis and well-points dewatering principle.
2) By the adoption of well point pipe positioning frame beams, the disclosure well solves the problems that drilling slag in a sedimentation tank has large water content and it is difficult to arrange and fix the well point pipes.
3) According to the disclosure, drilling slag mud is quickly solidified through electro-osmosis combined with well-points dewatering, so that the whole process of mud collection, transportation and fixed-point effective disposal in engineering construction can be supervised, illegal discharge is prevented, and environmental protection, energy saving and zero emission are truly implemented.

Figure 1:
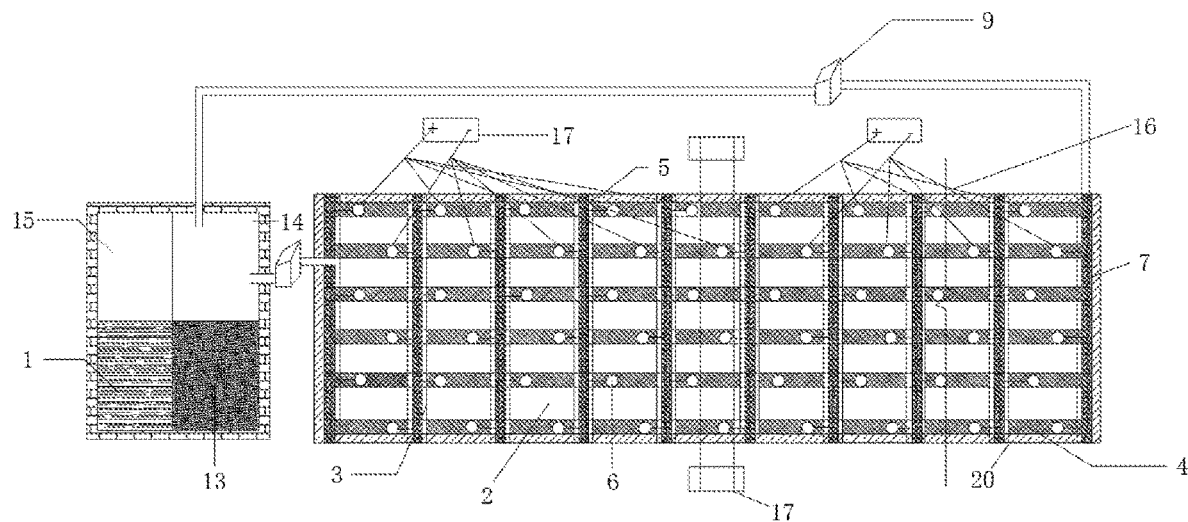
FIG. 1 is a layout plan of mud solidification based on electro-osmosis well points cooperating with well-points dewatering.
Figure 2:
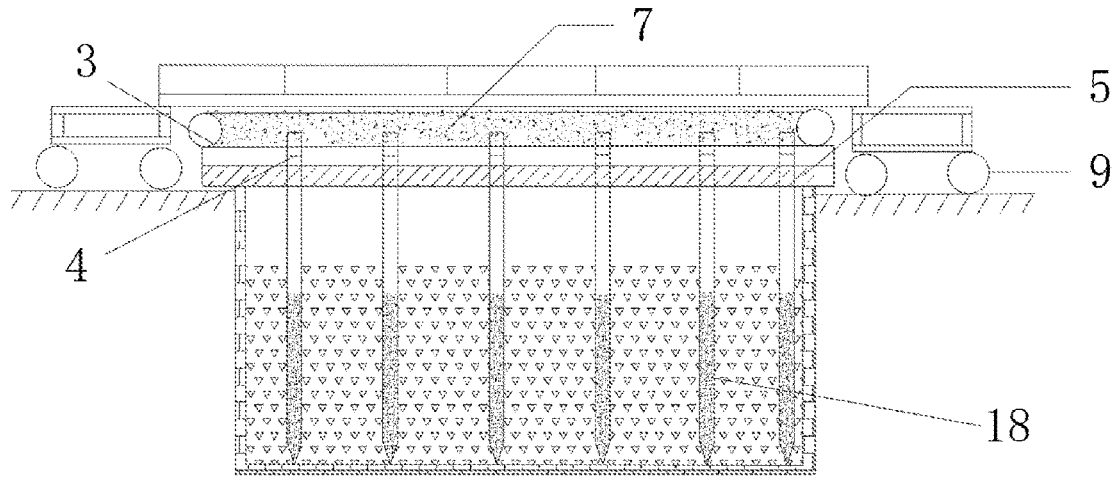
FIG. 2 is a cross-sectional view of mud solidification based on electro-osmosis well points cooperating with well-points dewatering.
Figure 3:
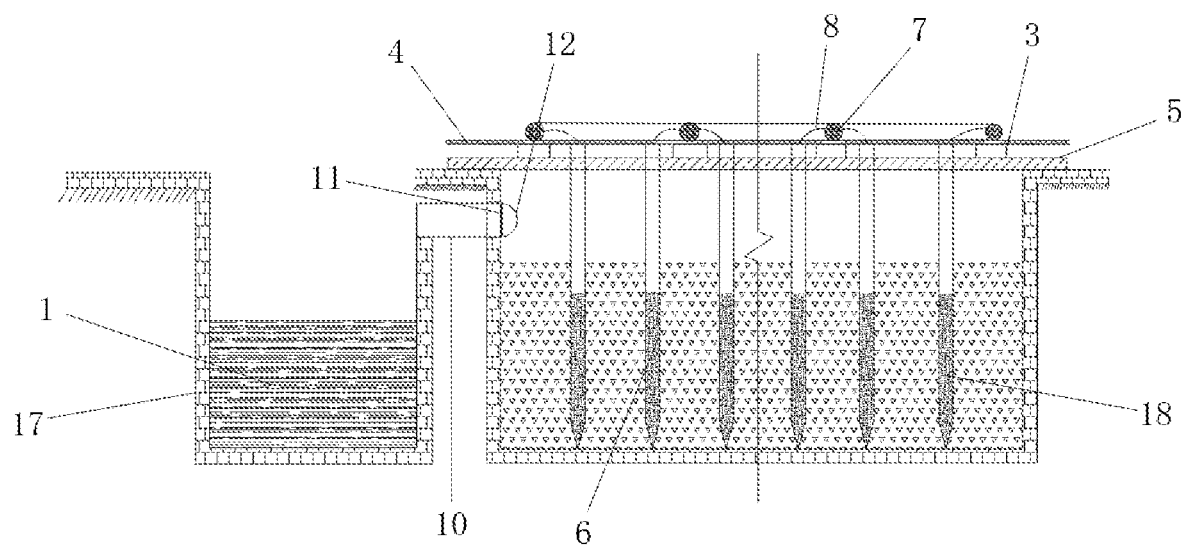
FIG. 3 is a side view of mud solidification based on electro-osmosis well points cooperating with well-points dewatering.
Figure 4:
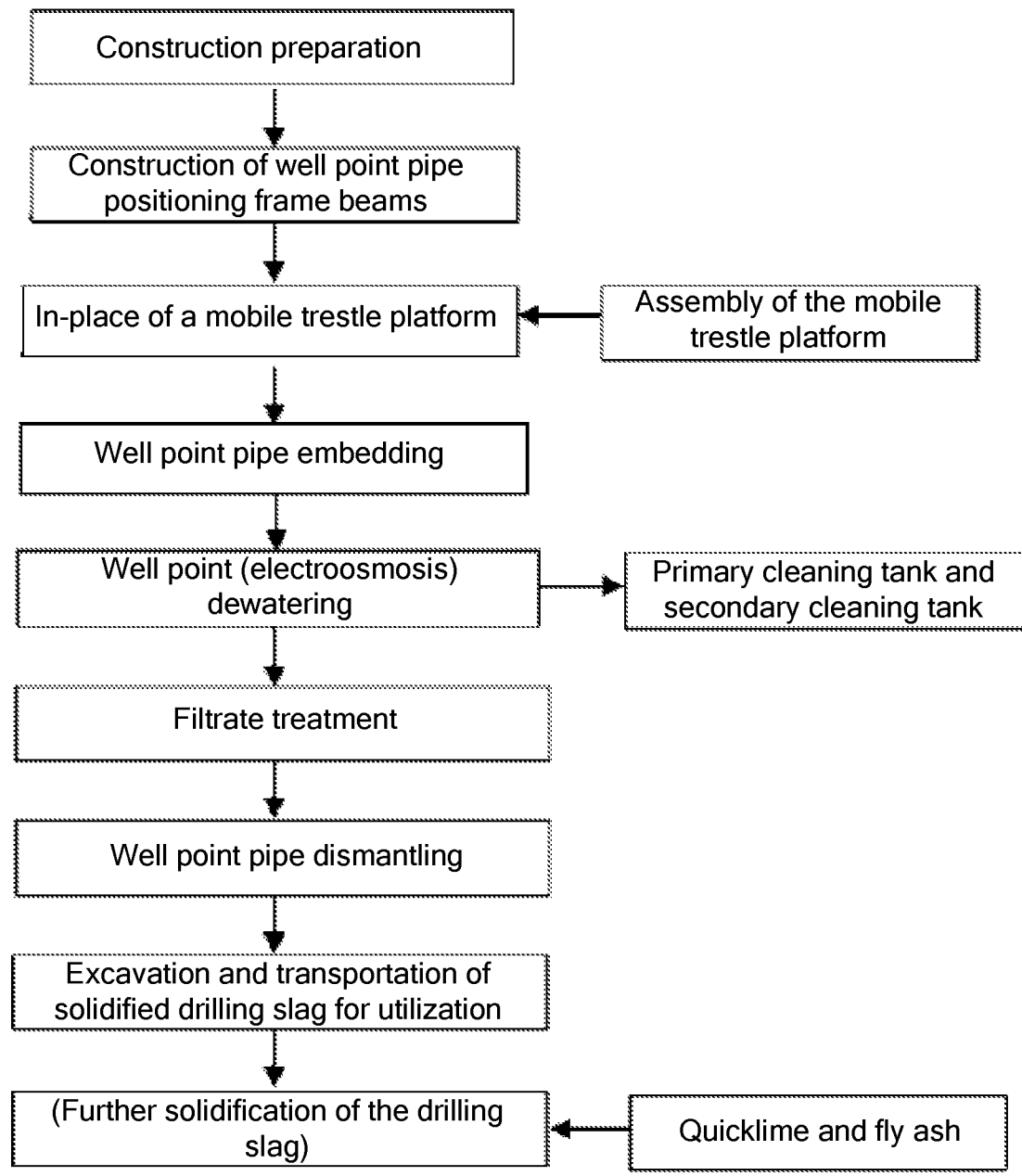
FIG. 4 is a flow chart of mud solidification based on electro-osmosis well points cooperating with well-points dewatering.

Reference numerals: mud tank 1, sedimentation tank 2, well point pipe support beam 3, well point pipe positioning frame beam 4, shore channel steel bearing beam 5 around a shore, well point pipe 6, water collecting main pipe 7, connecting elbow 8, vacuum water pump house 9, mud discharging pipe 10, filter screen 11, mud discharging pipe cover 12, slurry storage tank 13, primary cleaning tank 14, secondary cleaning tank 15, connecting wire 16, DC generator 17, filter pipe 18, mud tank brick wall 19, sedimentation tank brick wall 20.

DETAILED DESCRIPTION

The disclosure will be further described below with reference to examples. The following description of the examples is only for helping to understand the disclosure. It should be noted that for a person of ordinary skill in the art, several improvements and modifications can further be made to the disclosure without departing from the principles of the disclosure. These improvements and modifications should also fall into the protection scope of the disclosure.

A device for mud solidification based on electro-osmosis well points cooperating with well-points dewatering includes a mud tank 1, a sedimentation tank 2, well point pipe support beams 3, well point pipe positioning frame beams 4, channel steel bearing beams 5 around a shore, a well point pipe 6, a water collecting main pipe 7, connecting elbows 8, a vacuum water pump house 9, a mud discharging pipe 10, a filter screen 11, a mud discharging pipe cover 12, a slurry storage tank 13, a primary cleaning tank 14, a secondary cleaning tank 15, a connecting wire 16, a DC generator 17, filter pipes 18, a mud tank brick wall 19, and a sedimentation tank brick wall 20. The sedimentation tank 2 has a rectangular structure, the channel steel bearing beams 5 around a shore are laid on a tank wall inner side of the sedimentation tank 2, the well point pipe support beams 3 are laid at the top of the sedimentation tank 2 at equal intervals in a direction parallel to a short edge of the sedimentation tank, and the well point pipe positioning frame beams 4 are arranged on the well point pipe support beams 3 at equal intervals in a direction parallel to a long edge of the sedimentation tank. Quincuncial well point pipe holes are preset in the well point pipe positioning frame beams 4, and the well point pipes 6 are arranged in the well point pipe holes. The water collecting main pipe 7 is arranged in an S shape in the direction parallel to the short edge of the sedimentation tank, and the top of the well point pipe 6 is connected to the water collecting main pipe 7 through the connecting elbow 8. The well point pipe 6 is connected to the DC generator 17 through the connecting wire 16. The water collecting main pipe 7 is communicated with the primary cleaning tank 14 through the vacuum water pump house 9, the primary cleaning tank 14 is communicated with the secondary cleaning tank 15 and the slurry storage tank 13, and the sedimentation tank 2 is communicated with the mud tank 1 through the mud discharging pipe 10. The pipe opening of the mud discharging pipe 10 close to the sedimentation tank 2 is provided with a filter screen 11 and a mud discharging pipe cover 12. A lower portion of the well point pipe 6 is the filter pipe 18, and a pipe body of the filter pipe 18 is provided with quincuncial holes.

Based on the conventional on-site mud circulation mode of the pile foundation, the setting positions and quantity of the mud tank 1, the sedimentation tank 2 (preferably arranged in an elongated mode), the slurry storage tank 13, the primary cleaning tank 14 and the secondary cleaning tank 15 are determined according to the project scale and peripheral site conditions. After drilling slag is discharged into the sedimentation tank 2 for preliminary sedimentation, the upper muddy water flows into the mud tank 1 through the mud discharging pipe 10 for mud circulation, then the drilling slag (determined according to soil quality and a permeability coefficient) in the sedimentation tank 2 is subjected to dewatering and solidification by adopting electro-osmosis well points combined with light well points. When the drilling slag is sandy soil, broken pebbles or gravel soil, the well point pipes 6 are directly adopted for dewatering. When the drilling slag is clay or silty soil, electro-osmosis is applied to accelerate the flow of moisture in the soil into the well point pipes to improve the dewatering effect. When the drilling slag is mixed soil, well-points dewatering is performed and then electrification is performed to implement electro-osmosis dewatering, so as to achieve the dewatering and solidification effect.

Because of the high water content of pile slag, it is difficult to bury and fix the well point pipes. The well point pipe support beams 3 (in the direction of the short edge) are erected at the top of the sedimentation tank 2, and the well point pipe positioning frame beams 4 (in the direction of the long edge) are erected on the beams. Besides, a mobile trestle construction platform is designed, a trestle is utilized to move to arrange dewatering facilities (a vacuum water suction pump is arranged on the shore) such as the well point pipes 6 and the water collecting main pipe 7 in the sedimentation tank 2 so as to achieve the purpose of rapid dehydration and solidification of the drilling slag. Well-points dewatering filtrate is discharged into the primary cleaning tank 14 through the water collecting main pipe 7; and after sedimentation, supernatant flows into the secondary cleaning tank 15 to be used as structure curing water or water for preparing mud. The solidified muck is directly excavated and transported for roadbed filling according to pile foundation geology, or quicklime or fly ash is added to the muck for further solidification and then the muck is used as roadbed filler.

A treatment method using the device for mud solidification based on electro-osmosis well points cooperating with well-points dewatering includes the following specific steps.

Step 1: Preparation. According to the project scale and site conditions, the setting positions and excavation sizes of a mud tank 1, a sedimentation tank 2, a slurry storage tank 13, a primary cleaning tank 14 and a secondary cleaning tank 15 are determined, and the sedimentation tank 2 is preferably arranged in an elongated shape and preferably has a depth of 2.5 m. A wall of the tank is constructed with brick and mortar plastering. A well point pipe dewatering device with a depth matched with a depth of the sedimentation tank 2 is purchased and processed. A well point pipe 6 is a steel pipe with a diameter of 51 mm and a length of 2.5 m. φ10 mm quincuncial holes (6 rows) are drilled in a filter pipe 18 which is 1.5 m long at the lower end of the well point pipe and has the same diameter as the well point pipe. #6 iron wires are wound around the filter pipe and are at intervals of 15 mm, the filter pipe is wrapped with two layers of nylon window screens and three layers of brown leather, and #8 iron wires are wound and are at intervals of 35 mm. Connecting elbows 8 are rubber tubes or plastic transparent tubes with a diameter of 38 mm, and each tube is provided with a valve to facilitate inspection of well points. A water collecting main pipe 7 is connected by steel pipes with a diameter of 80 mm in a segmented mode, each segment has a length of 4 m, and well point pipe joints are arranged at intervals of 0.2 m. An anode and cathode of the electro-osmosis well are well point pipes 6, and a DC generator 17 is adopted for electrification.

Step 2: Construction of well point pipe positioning frame beams. Based on the characteristics of high water content of drilling slag in the sedimentation tank 2, well point pipes are arranged in a quincuncial shape at intervals of 50 cm. Channel steel bearing beams 5 around a shore are laid around the sedimentation tank 2 (along the inner side of the tank wall at 30 cm), then well point pipe support beams 3 are laid at intervals of 1.8 m in the direction parallel to the short edge, and then well point pipe positioning frame beams 4 are arranged at intervals of 25 cm above the well point pipe support beams in the direction parallel to the long edge of the sedimentation tank 2. The well point pipe positioning frame beam 4 is formed by processing a steel plate which is 1.5 cm thick and is 12 cm wide. The well point pipe positioning frame beam 4 is cut in advance to form well point pipe holes with a pore diameter of 6.5 cm.

Step 3: Assembly of a mobile trestle platform. A mobile trestle is assembled on land at one side of the sedimentation tank. A mobile platform is assembled first. A platform frame and columns are made of #14 channel steel. The heights of columns preferably enable the trestle platform to be higher than the height of the well point pipe by 20 cm. Two #16 channel steel longitudinal beams (the welding of a base of a fence near the edge is completed in advance) are installed on the platform, and the center-to-center spacing between the two longitudinal beams is 100 cm. Then assembly type fence columns and a movable fence plate are inserted in a trestle girder base. 5 cm×5 cm square timber distribution beams are placed in two channel steel longitudinal beams, and then a 1 cm thick anti-sliding steel bridge deck is laid on the channel steel longitudinal beams to be used as a well point pipe embedding construction channel. Finally, handrail bases (φ51 steel pipes with a length of 20 cm) are pre-welded on each mobile platform of the trestle along two sides in the direction of the long edge of the sedimentation tank to assemble manual push-pull handrails.

Step 4: Well point pipe arrangement. By means of the trestle platform, well point pipes are arranged row by row in the direction parallel to the short edge according to the well point pipe holes of the well point pipe positioning frame beams 4 at the top of the sedimentation tank. In case of parts where it is difficult to perform local arrangement, high-pressure water is adopted to assist in punching and embedding. The water collecting main pipe 7 is arranged in an S shape in the direction parallel to the short edge of the sedimentation tank, and the top of the well point pipe 6 is connected to the water collecting main pipe 7 through the connecting elbow 8. When all well point pipes 6, the water collecting main pipe 7 and the connecting wire 16 of the cathode and the anode are connected, the trestle is moved to the outside of the sedimentation tank.

Step 5: well point (electro-osmosis) dewatering. Well point (electro-osmosis) dewatering is performed according to the pile foundation geology (permeability coefficient). When the drilling slag is sandy soil, crushed gravel or broken pebbles, etc. with a permeability coefficient greater than 3 m/d, the well point pipe 6 is directly used for dewatering. When the drilling slag is silt, clay, etc. with a permeability coefficient less than 0.1 m/d, the well point pipes themselves are used as the anode and the cathode and connected to the DC generator 17 through the connecting wire 16, and a direct current is introduced to perform electro-osmosis dewatering. That is, negatively charged soil particles move towards the anode (electrophoresis), while the positively charged water concentrates towards the cathode, resulting in electro-osmosis. By the dual effects of electro-osmosis and vacuum in the well point pipes, the water in the drilling slag is forced to be quickly discharged from the well point pipes, and water is continuously pumped from the well points, so that the water in the drilling slag is gradually discharged and solidified. When the geology is complex and the drilling slag is all kinds of mixed soil, the well-points dewatering is performed, and then the electro-osmosis dewatering method is adopted to accelerate the solidification of mud.

Step 6: Filtrate treatment. Muddy water discharged out of the water collecting main pipe 7 via the well-points dewatering first flows into the primary cleaning tank 14; after preliminary precipitation, supernatant flows into the secondary cleaning tank 15, and bottom slurry is discharged into the slurry storage tank 13 for preparation of mud. Clear liquid in the secondary cleaning tank can be used for structural curing or preparation of muddy water.

Step 7: Well point pipe dismantling. The well point pipes are dismantled after muck solidification of well point (electro-osmosis) dewatering is completed.

Step 8: Excavation and transportation of solidified drilling slag for utilization. Gravel soil drilling slag (with water content of about 30%) can be directly excavated and transported for roadbed filling. Cement or quicklime is added to silt or clay with a water content of 35-40% for further solidification and then the silt or clay is uniformly transported out for use or stacking.

The invention claimed is:

1. A device for mud solidification based on electro-osmosis well points cooperating with well-points dewatering, comprising a mud tank (1), a sedimentation tank (2), well point pipe support beams (3), well point pipe positioning frame beams (4), channel steel bearing beams (5), well point pipes (6), a water collecting main pipe (7), connecting elbows (8), a vacuum water pump house (9), a mud discharging pipe (10), a slurry storage tank (13), a primary cleaning tank (14), a secondary cleaning tank (15), a connecting wire (16), a DC generator (17) and filter pipes (18); wherein the sedimentation tank (2) has a rectangular structure, the channel steel bearing beams (5) are laid on a tank wall inner side of the sedimentation tank (2), the well point pipe support beams (3) are laid at a top of the sedimentation tank (2) at equal intervals in a direction parallel to a short edge of the sedimentation tank, and the well point pipe positioning frame beams (4) are arranged on the well point pipe support beams (3) at equal intervals in a direction parallel to a long edge of the sedimentation tank; well point pipe holes are preset in the well point pipe positioning frame beams (4), the well point pipes (6) are arranged in the well point pipe holes, and a lower portion of each well point pipe (6) is one filter pipe (18); the water collecting main pipe (7) is arranged at a top of the well point pipe (6) in the direction parallel to the short edge of the sedimentation tank, the top of the well point pipe (6) is connected to the water collecting main pipe (7) through a corresponding one of the connecting elbows (8); the well point pipe (6) is connected to the DC generator (17) through the connecting wire (16); the water collecting main pipe (7) is communicated with the primary cleaning tank (14) through the vacuum water pump house (9), the primary cleaning tank (14) is communicated with the secondary cleaning tank (15) and the slurry storage tank (13), and the sedimentation tank (2) is communicated with the mud tank (1) through the mud discharging pipe (10).

2. The device for mud solidification based on electro-osmosis well points cooperating with well-points dewatering according to claim 1, wherein a pipe opening of the mud discharging pipe (10) close to the sedimentation tank (2) is provided with a filter screen (11) and a mud discharging pipe cover (12).

\* \* \* \* \*